Jan. 9, 1934.      C. E. FAWKES      1,942,920
VISCOSIMETER
Filed Jan. 10, 1930      2 Sheets-Sheet 1
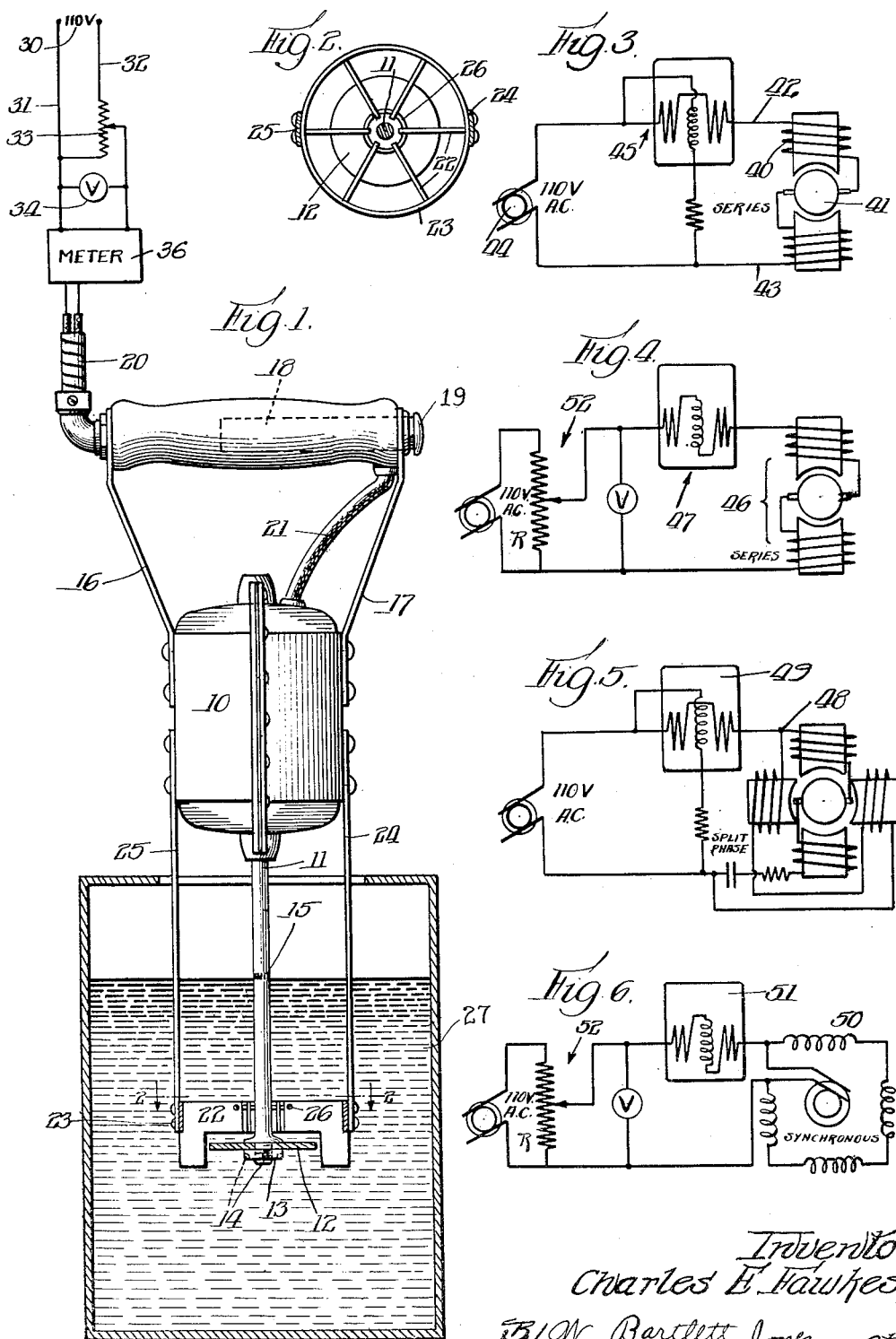
Inventor:
Charles E. Fawkes,
By W. Bartlett Jones, atty.

Jan. 9, 1934.   C. E. FAWKES   1,942,920
VISCOSIMETER
Filed Jan. 10, 1930   2 Sheets-Sheet 2
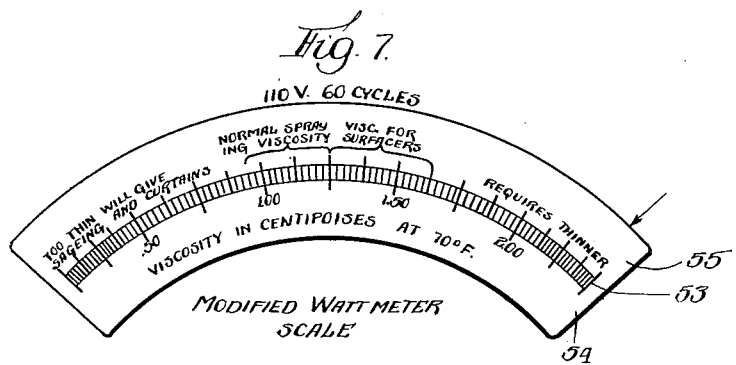
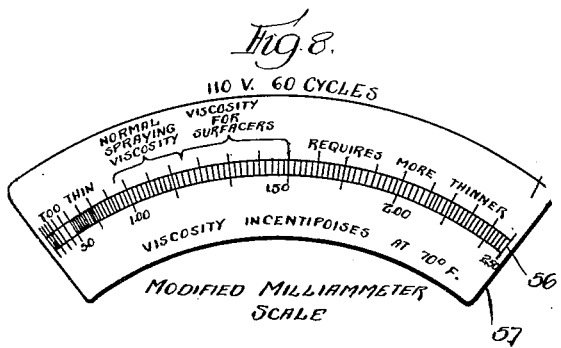
Inventor:
Charles E. Fawkes,
By W. Bartlett Jones.  atty Patented Jan. 9, 1934

1,942,920

UNITED STATES PATENT OFFICE 1,942,920

VISCOSIMETER

Charles Elliott Fawkes, Chicago, Ill., assignor to The De Vilbiss Company, Toledo, Ohio, a corporation of Ohio Application January 10, 1930. Serial No. 419,964

7 Claims. (Cl. 265—11)

The present invention relates to apparatus for measuring the viscosity of liquids. It has particular reference to a device which may be inserted into a liquid for making a measurement of relative or absolute viscosity. The device is so constructed that the frictional resistance between the liquid and a moving part is translated into a variation in an electrical circuit, which variation may be recorded or indicated directly in viscosity units.

The measurement of viscosity heretofore has been accomplished by highly developed scientific instruments, and by certain empirical methods in which relative viscosities are obtained by use of calibrated comparison apparatus. In both instances the liquid is transferred to the apparatus, and this is to be distinguished from the use of the apparatus of the present invention, wherein the device embodies means that need merely to be inserted into the liquid in a manner as simple as making a thermometric measurement.

There are two general methods for measuring viscosity, (a) rate of flow of liquid through an orifice, and (b) measuring resistance offered to a moving body in contact with the liquid.

For the orifice method, various instruments have been developed, like those of Pouisselle, Ostwald, Bingham and others, and patents have been issued to Barbey, Engler, Redwood, Saybolt and others. This method requires measurement of elapsed time, definite weights or volumes, and standard conditions. Errors arise from inaccuracies in the orifice or apparatus, variation of liquid head, evaporation at the orifice, and the observations of the operator. In addition, there is apparatus to be cleaned and dried for maintaining standard conditions, and calculations to be made or charts to be read.

For the moving body method, various modifications have been employed, such as a falling ball in the liquid, a pendulum, an air bubble, and a rising float. Time must be measured, and known constants employed. These methods are not quick, nor rapid, nor simple, and involve calculations to determine results.

Other methods are employed, such as that of MacMichael, who measures the torque exerted on a cylinder immersed in a viscous liquid, which is enclosed in another cylinder turning about the first. This is more of a scientific instrument in which the torque denotes viscosity. The reading is necessarily localized to the apparatus. There is a Stormer instrument, modified from Searles, which consists of a paddle or cylinder immersed in the liquid, and rotated by action of a falling weight. Revolutions and time are measured to denote viscosity. These have many of the disadvantages of others hereinabove mentioned, and experience and technique are required to operate them accurately.

The present invention aims to overcome many of these disadvantages and to provide additional advantages. It provides an apparatus which is electrically operated, which is immersed in the liquid, which may indicate viscosity directly in a meter or record it at a remote point, which may be disconnected from the meter, and used with another meter, or which may be replaced by another unit for a single meter, thereby to permit a multiple indicating or recording system. It eliminates observations, calculations, and the personal equation of the operator. It practically eliminates apparatus to be cleaned. It permits bringing the device to the liquid, irrespective of the liquid container, rather than bringing the liquid to an instrument. It may therefore be carried directly into the shop or factory, and the meter or indicator may be near the point of use, or remotely located and out of reach of the operator at the liquid end, or it may be in two separated places so that a check on operations is permitted.

The apparatus, specifically, employs a motor driven rotary member to be immersed in the liquid, the whole being so designed that a meter which is associated with the motor converts the load on the rotary member, introduced by the resistance of the viscous liquid, into readable or automatically recordable viscosity units.

It is a particular object of the invention to provide a viscosimeter upon which the load is electrically measured and is substantially entirely a frictional load between the rotor and the liquid.

Another object of the invention is the provision of a form of revolution for the rotor, and baffle means associated therewith to minimize mechanical propulsion of the liquid by said rotor.

Various other objects and advantages of the invention will appear more clearly from the following general and specific description of the illustrative devices embodying the invention, as shown in the accompanying drawings, in which Fig. 1 represents a motor carrying a handle, rotor and combination guard-baffle, showing also preferred electrical connections.

Fig. 2 is a cross section on line 2—2 of Fig. 1 showing the guard-baffle construction.

Figs. 3, 4, 5 and 6 represent suitable motor circuits and meter connections.

Figs. 7 and 8 represent meter scales indicating viscosity units.

In Fig. 1 there is shown generally a hand-held motor-driven rotor immersed in a container of liquid, the motor being connected through a meter according to this invention, and the whole being operated from a light socket or standard power line. A suitably chosen motor 10 forms the body of the apparatus. It is entirely enclosed, not only to keep it clean, but to prevent sparks igniting vapors that may be present. It is preferably a vapor proof motor. Its shaft is extended, preferably being made long, to provide an integral rotor spindle 11, at the end of which there is mounted a circular disc 12, by a removable nut 13. The nut is circular and is provided with recesses 14 for receiving a key to turn the nut. The spindle may be marked, as at 15 to indicate a suitable standard depth of immersion. It will be noted particularly that the rotor provides a surface of revolution about the axis, so that in rotating in a liquid there is only friction therewith and not a propulsion effect.

The motor casing bears brackets 16 and 17, opposite each other, across which is mounted a handle 18. Within the handle there may be an electrical switch (not shown) for which there is an operating button 19 at one end. This may be so constructed that the motor operates only when the button is depressed. The switch in the handle has preferably a vapor proof case construction or is a vapor proof switch. A cable 20 for electric wires is shown leading to the motor by way of the handle. The number of wires in the cable may vary according to the method of connection as will hereinafter appear, but two are preferred for economy and simplicity.

The speed of the rotor may cause a swirl of the liquid and it is desirable to insure standard immersion for best results. Such a swirl tends to throw liquid away from the rotor, either from the spindle, or from the disc and spindle. Consequently, I employ means to prevent the swirl, and preferably attach such means to the device as a permanent part thereof, to enclose the disc end of the rotor. This performs a double function, in that in addition to preventing the swirl, it forms a guard about the rotor, not only to protect the container, but to protect a careless operator, and to protect the spindle from damage at all times.

Such a means is represented in the drawings, for illustrative purposes, as a series of six radial blades 22 above and about the disc 12. They are carried by a band or ring 23, which is mounted to the motor casing by brackets 24 and 25. The inside edges of the blades may be united together by a ring 26. The blades 22 preferably extend beyond the end of the rotor to increase the protective value of the guard. The device is shown immersed in liquid 27, such as paint or volatile lacquer, to measure viscosity. It may be immersed and operated in other liquid quickly to clean the device after use, if this is necessary.

In Fig. 1, a power source 30 is indicated with wires 31 and 32 connected to the source. Since ordinary line voltages may vary during the day, or from place to place, I prefer to operate the motor for standardized work at a voltage lower than the line voltage, so that the available voltage may be reduced to a standard working voltage for the motor. This may be accomplished by inserting a variable resistance 33 in one of the lines, or across the lines as shown, and providing a voltmeter 34 across the lines beyond the rheostat 33. As connected in the drawings the rheostat may be adjusted to provide a fixed voltage, for example 100 volts, for the motor. The power lines lead thence to a meter 36 which may be of several types as will hereinafter appear. The cable 20 from the motor is shown connected to the meter.

Various type motors and meters may be used but they must be properly related in the combination. It is preferred that the motor be one which has a definite type of load curve indicating the value metered. A watt meter may be used, and an ammeter may be used, and the motor should be chosen to correspond. I may use a synchronous motor, a split-phase motor, a series motor, or other types. Several examples of motors and meters are hereinafter described to illustrate the relation.

In Figs. 3 and 4 are shown series motors having the proper electrical characteristics, such as General Electric Company motor, type A Z—161, Model 33,480. This motor has a field winding 40 in series with an armature 41. It is connected by wires 42 and 43, to the power source 44 through watt meter 45. In Fig. 4 series motor 46 is connected through ammeter 47 to a power line in which the voltage is fixed by a rheostat 52 as described in connection with Fig. 1.

Alternating or direct current may be used with the series motors above described, making the apparatus universal as to these currents. It is of course to be understood that the meter employed, such as the ammeter 47, may be provided with a D. C. scale and/or an A. C. scale reading in viscosity units rather than in amperes.

In experimenting with commercial motors of the above type, I have found that they are practically standardized and uniform, and under a given consistency load, the power consumption of one motor will not deviate more than 5% from the average of all the motors. In order to standardize the equipment, I modify each assembly which involves these slightly variable motors, so that when the viscosity measuring rotor is immersed in water at 70° F. the meter employed indicates a viscosity of approximately 1.0 centipoises. Other standards for calibration may be found in Bureau of Standards Technical Paper No. 112, by Herschel. This may be done by shunting a slight resistance across the ammeter or by placing a resistance in series with the motor.

It will be observed that in Fig. 4 the circuit shown has an ammeter and means to adjust the voltage, while the circuit in Fig. 3 has a watt-meter and no means to adjust the voltage. The use of a fixed voltage permits measuring the load with an ammeter, and permits dispensing with the more expensive watt meter, which is capable of compensating for voltage changes. The fixed voltage method gives the greater assurance that the motor is operating at all times near its rated voltage, or near that for which the motor and meter as combined are suitably calibrated to indicate directly on the meter scale the viscosity units rather than current units.

In Fig. 5 there is shown a split phase motor 48 for alternating current, used in connection with a watt meter 49.

In Fig. 6 there is shown a synchronous motor 50, also for alternating current, used with an ammeter 51, and means 52 to fix the voltage applied to the motor.

In Figs. 7 and 8 are shown meter scales reading in viscosity units, as they may be employed in this invention. In Fig. 7, 53 represents a wattmeter scale for 110 v 60 cycle current, marked with legends for use in viscosity determinations on lacquers. The lower side 54 shows viscosity units in centipoises at 70° F. The upper side 55 shows legends indicating treatment for or status of the lacquer measured.

In Fig. 8 the meter scale 56 corresponds to a milliammeter, and the lower side 57 shows viscosity units, while the upper side 58 shows legends.

Various uses and installations will of course be suggested by this disclosure to those who are interested in viscosity of paints, varnishes, oils, gums, glue, starches, dextrines, soaps, and a variety of other liquids for which the device may be used.

The invention is not to be considered as limited to the illustrative disclosure herein given, but is to be considered as contemplating various departures, modifications, and combinations such as fall within the scope of the appended claims.

What I claim is:

1. In an electrically driven viscosimeter having a rotary shaft adapted to be freely immersed in a body of liquid, a form of revolution on said shaft whereby friction with the liquid is obtained without mechanical propulsion of the liquid, a series of baffle plates extending edgewise radially and closely adjacent to said form of revolution and having recesses therein into which recesses extends the form of revolution, and a circular band enclosing said baffle plates.

2. In an electrically driven viscosimeter having a rotary shaft adapted to be freely immersed in a body of liquid, a form of revolution on said shaft whereby friction with the liquid is obtained without mechanical propulsion of the liquid, and a series of baffle plates arranged radially with respect to said form, said plates having an edge terminating closely adjacent the periphery of said form.

3. In an electrically driven viscosimeter having a rotary shaft adapted to be freely immersed in a body of liquid, a form of revolution on said shaft whereby friction with the liquid is obtained without mechanical propulsion of the liquid, and a series of baffle plates arranged radially with respect to said form, said plates extending axially above and below the form of revolution, and terminating closely adjacent the surface of said form.

4. In an electrically driven viscosimeter having a rotary shaft adapted to be freely immersed in a body of liquid, a form of revolution on said shaft whereby friction with the liquid is obtained without mechanical propulsion of the liquid, and a series of baffle plates arranged radially with respect to said form, said plates extending beyond the form in the direction away from the driven end of said shaft, and terminating closely adjacent the surface of said form.

5. In an electrically driven viscosimeter having a rotary shaft adapted to be freely immersed in a body of liquid, a form of revolution on said shaft whereby friction with the liquid is obtained without mechanical propulsion of the liquid, and baffle means adjacent said form to prevent free rotation of the liquid resulting from friction with said form.

6. In an electrically driven viscosimeter having a rotary shaft adapted to be freely immersed in a body of liquid, a form of revolution on said shaft whereby friction with the liquid is obtained without mechanical propulsion of the liquid, and a series of baffle plates positioned in planes which intersect at the axis of said shaft and having recesses therein into which extends the form of revolution, said plates having the edges of said recesses terminating closely adjacent the periphery of said form of revolution.

7. In an electrically driven viscosimeter having a rotary shaft adapted to be freely immersed in a body of liquid, a form of revolution on said shaft whereby friction with the liquid is obtained without mechanical propulsion of the liquid, and a series of baffle plates extending in general radial directions about the axis of said rotor and having recesses therein into which extends the form of revolution, said plates having the edges of said recesses terminating closely adjacent the periphery of said form.

CHARLES ELLIOTT FAWKES.